(12) United States Patent
Murphy et al.

(10) Patent No.: US 6,628,754 B1
(45) Date of Patent: Sep. 30, 2003

(54) METHOD FOR RAPID NOISE REDUCTION FROM AN ASYMMETRIC DIGITAL SUBSCRIBER LINE MODEM

(75) Inventors: Tim Murphy, Ramona, CA (US); Martin Staszak, Poway, CA (US); Richard Williams, San Diego, CA (US)

(73) Assignee: 3Com Corporation, Santa Clara, CA (US)

( * ) Notice: Subject to any disclaimer, the term of this patent is extended or adjusted under 35 U.S.C. 154(b) by 16 days.

(21) Appl. No.: 09/755,927

(22) Filed: Jan. 5, 2001

Related U.S. Application Data

(60) Provisional application No. 60/174,955, filed on Jan. 7, 2000.

(51) Int. Cl.$^7$ .......................... H04M 1/24; H04M 3/08; H04M 3/22
(52) U.S. Cl. ..................... 379/1.03; 379/22.02; 379/24; 379/32.04; 370/252; 370/286; 370/493
(58) Field of Search ................. 379/1.03, 1.04, 379/10.01, 22, 22.02, 22.04, 22.08, 27.01, 27.03, 28, 29.03, 31, 394, 24; 370/493, 252, 286, 410, 494; 375/227, 285; 455/67.6

(56) References Cited

U.S. PATENT DOCUMENTS

| | | | | |
|---|---|---|---|---|
| 6,236,714 B1 | * | 5/2001 | Zheng et al. ................... | 379/6 |
| 6,266,348 B1 | * | 7/2001 | Gross et al. ................ | 370/493 |
| 6,356,585 B1 | * | 3/2002 | Ko et al. .................... | 375/222 |
| 6,370,187 B1 | * | 4/2002 | Agah ......................... | 375/219 |
| 6,445,733 B1 | * | 9/2002 | Zuranski et al. ............ | 375/231 |

OTHER PUBLICATIONS

ITU–Telecommunication Standardization Sector, Jan. 18–22, 1999, Draft Recommendation G.992.2, pp. 1–152.
ITU–Telecommunication Standardization Sector, Oct. 12–23, 1998, G.994.1 Draft Document, pp. 1–35.
Tampere University of Technology Telecommunication Laboratory, Feb. 17, 1995, ADSL, pp. 1–20.
ITU–T Recommendation G.992.2(06/99)—Splitterless asymmetric digital subscriber line (ADSL) transceivers.
ITU–T Recommendation G.994.1 (06/99)—Handshake procedures for digital subscriber line (DSL) transceivers.

* cited by examiner

Primary Examiner—Binh Tieu
(74) Attorney, Agent, or Firm—McDonnell Boehnen Hulbert & Berghoff

(57) ABSTRACT

A method for rapid noise reduction from a splitterless ADSL modem. The modem stores a value for the power level of its transmitter in a table along with transmission characteristics of the telephone loop. The stored value for its power level is the power level that was previously successful with the transmission characteristics in achieving the Showtime data transfer mode. When the modem measures similar transmission characteristics of the telephone loop, such as a slope of the frequency response of the loop, a power level that would suppress downstream noise, or the dc voltage of the loop, the modem searches the table for matching transmission characteristics. If the table contains a table entry that matches these measured transmission to characteristics, the modem restores the stored transmitter power of the modem. In this manner, the modem may rapidly achieve Showtime because it is restoring a transmitter power level that was previously successful under the same condition of the telephone loop.

17 Claims, 8 Drawing Sheets

BIN

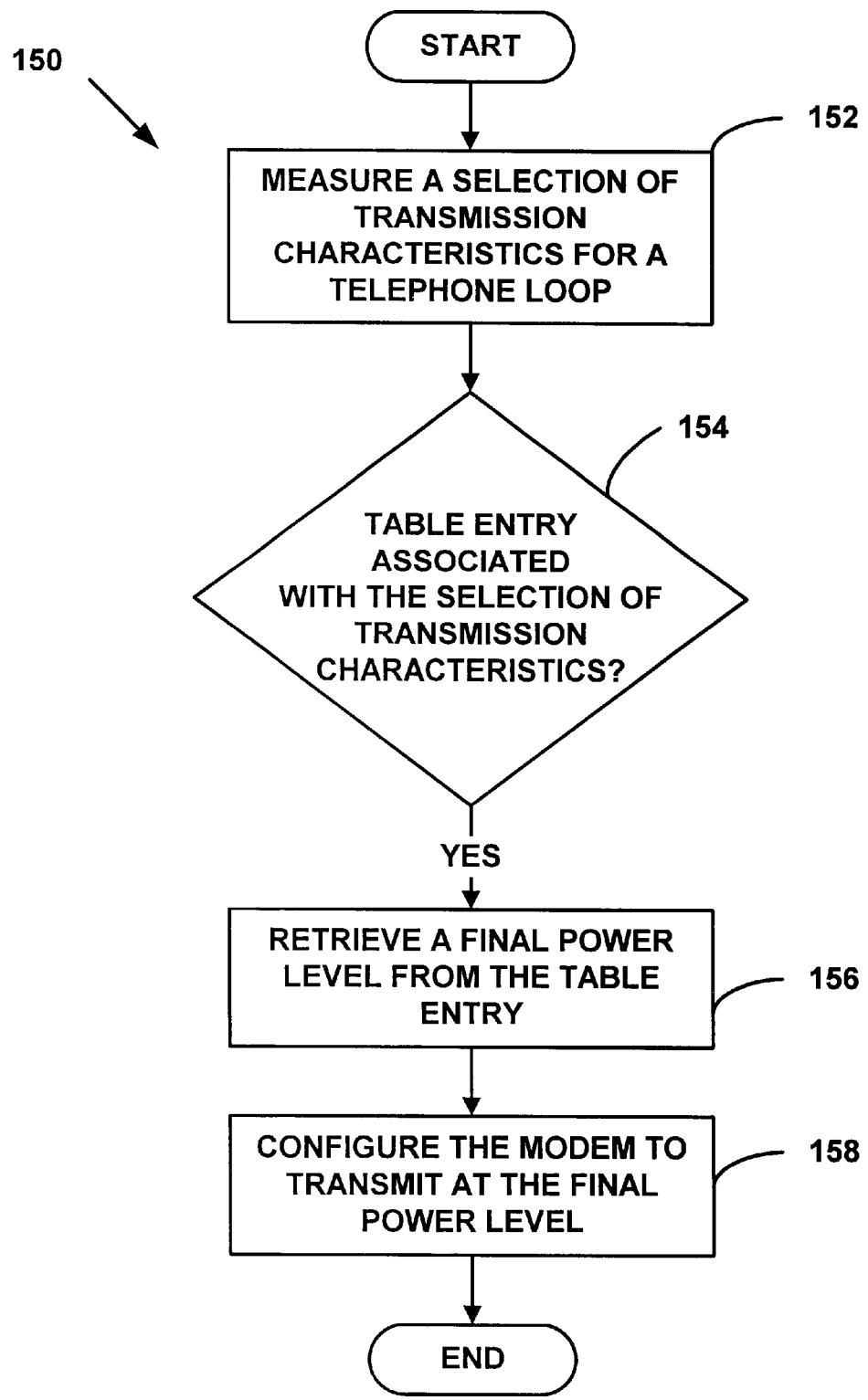

METHOD FOR RAPID NOISE REDUCTION FROM AN ASYMMETRIC DIGITAL SUBSCRIBER LINE MODEM

REFERENCE TO RELATED APPLICATIONS

This application claims the benefit of U.S. Provisional Application Serial. No. 60/174,955 titled "Method for Rapid Noise Reduction from an Asymmetric Digital Subscriber Line Modem," naming the same inventors, filed on Jan. 7, 2000, claiming priority benefits under 35 U.S.C. §119(e).

FIELD OF INVENTION

The present invention relates to communications in digital subscriber lines. More specifically, it relates to a method for rapid noise reduction from a splitterless asymmetric digital subscriber line modem.

BACKGROUND OF THE INVENTION

Digital Subscriber Line ("DSL") is a developing modem technology that allows existing copper telephone lines to carry high bandwidth information. Familiar twisted-pair telephone lines are then able to carry high speed data communication to and from a customer site in addition to retaining a plain old telephone service ("POTS") channel for voice communication. At the customer site, a DSL modem receives the downstream signal representing data for a customer from a central office for a telephone company and transmits an upstream signal representing data from the customer to the central office.

One configuration of DSL is generally termed Asymmetric Digital Subscriber Line ("ADSL"). ADSL allows high-speed data transport to the customer site but only medium-speed data transfer from the customer site, whence the asymmetry. ADSL also allows the simultaneous use of the ADSL modem and POTS on the same telephone line. In this configuration, at a point where the twisted-pair telephone line enters the customer site, filters split the POTS channel from the ADSL modem channels. One problem with this type of ADSL, however, is that a technician from the telephone company has to visit the customer site and install the splitter, referred to as "the truck roll."

To overcome this problem, another configuration of ADSL forgoes the requirement of a splitter at the customer site. This configuration is generally called "splitterless ADSL" and also goes under the name of "G.Lite." Splitterless ADSL is described in the International Telecommunications Union-Telecommunication Standardization Sector (hereinafter "ITU-T", formerly known as the CCITT) Recommendation G.992.2, February 1999, which is incorporated herein by reference. ITU-T standards can be found on the World Wide Web at the Universal Resource Locator ("URL") "www.itu.ch." Splitterless ADSL modems include those manufactured by 3Com Corporation of Santa Clara, Calif., Lucent Technologies of Murray Hill, N.J., Texas Instruments of Dallas, Tex., and others.

In splitterless ADSL, an ADSL modem directly shares the same twisted-pair telephone line as a POTS telephone without the intervention of a splitter. Sharing the same twisted-pair telephone line, however, may result in some of the upstream ADSL signal bleeding over into the audible frequency range of the POTS telephone. Audible noise effects, such as a buzzing in the earpiece or speaker, are heard on the POTS telephone when off-hook. Also, sharing the same twisted-pair telephone line may introduce noise into the downstream data transfer. The downstream noise effect is the response of the internal circuitry of the telephone to the upstream ADSL signal. Both types of noise may impair the simultaneous use of the telephone and the ADSL modem.

Each telephone has a different response to the upstream ADSL signal: some telephones introduce little audio or downstream noise, such as many of the cordless telephones, while other telephones introduce a lot of either noise, thus severely reducing the customer's simultaneous use of the telephone and the rate at which the modem can receive data. Therefore, a method for reducing the audible and downstream noise should preferably respond to whether the telephone introduces a little or a lot of noise.

It is desirable, therefore, to reduce the downstream noise introduced by the telephone to reduce audible noise in the telephone and optimize the downstream data transfer. It is also desirable to achieve noise reduction for a wide range of telephone models. This may allow customers to use their telephones while the ADSL modem is transferring data.

SUMMARY OF THE INVENTION

In accordance with preferred embodiments of the present invention, some of the problems associated with rapidly reducing noise in a splitterless ADSL modem are overcome.

One aspect of the invention includes a method for rapidly reducing noise from a telephone in a splitterless ADSL modem to enable simultaneous use of the telephone and the modem. The telephone and the modem share a telephone loop. The method includes measuring a selection of transmission characteristics for the telephone loop. The modem determines whether a table entry is associated with the selection of transmission characteristics. The table entry comprises stored transmission characteristics that permit the modem to achieve a data transfer mode. When the table entry is associated with the selection of transmission characteristics, the modem retrieves a power level from the table entry and configures the modem to transmit at the power level. In this manner, the modem may recognize characteristics of the telephone loop and adopt a configuration of its upstream transmitter that had previously successfully allowed the modem to attain a data transfer mode.

The foregoing and other features and advantages of preferred embodiments of the present invention will be more readily apparent from the following detailed description, which proceeds with reference to the accompanying drawings.

BRIEF DESCRIPTION OF THE DRAWINGS

Preferred embodiments of the present invention are described with reference to the following drawings, wherein:

FIG. 8 is a flow diagram illustrating a preferred method for rapidly reducing noise from a telephone in a splitterless ADSL modem.

APPENDIX

The attached appendix includes computer source code for implementing the preferred embodiments described herein.

DETAILED DESCRIPTION OF PREFERRED EMBODIMENTS

Figure 1:
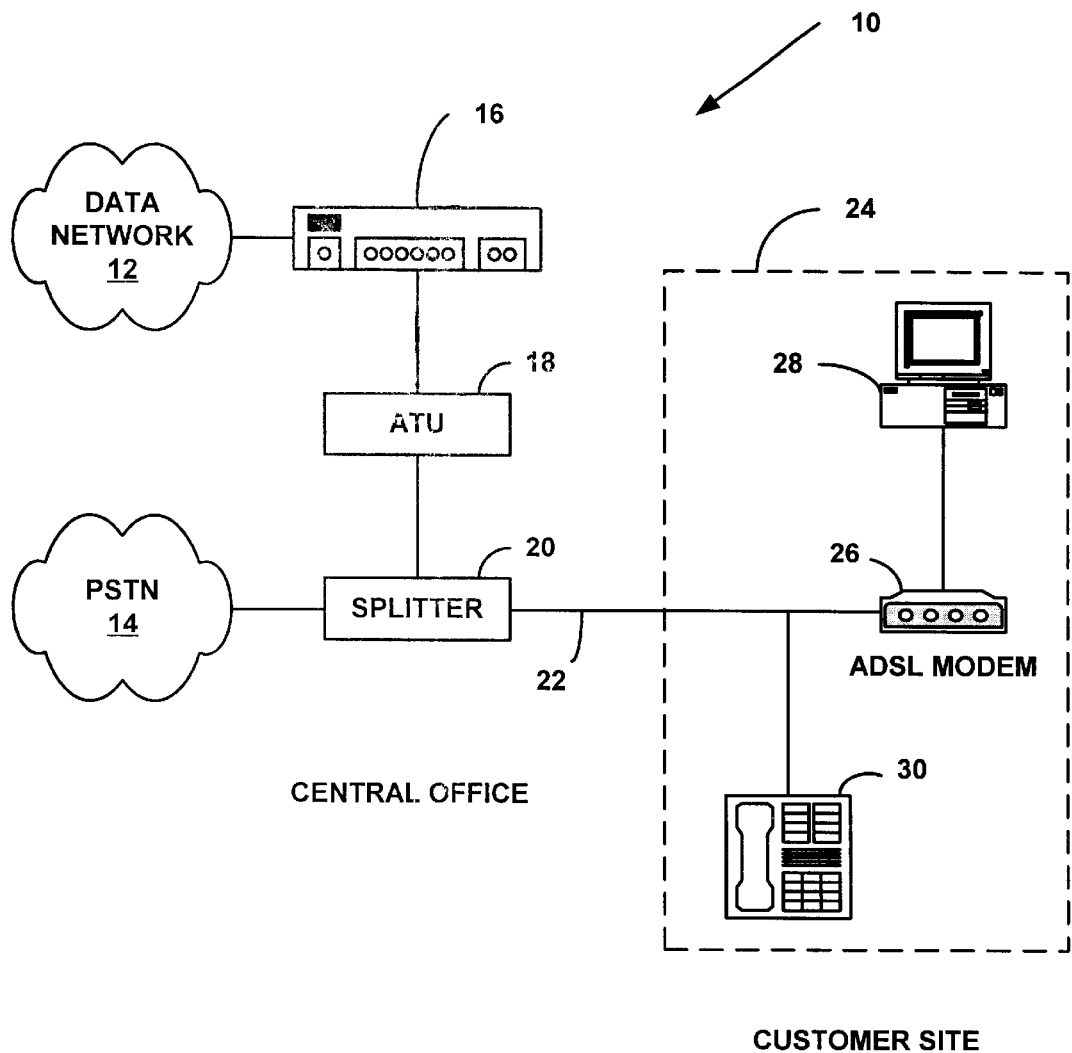
FIG. 1 is a block diagram illustrating a splitterless ADSL system.

FIG. 1 is a block diagram illustrating a splitterless ADSL system 10. The system 10 allows digital communications from a data network 12 and analog telephone signals from a Public Switched Telephone Network ("PSTN") 14 to be combined and sent to a customer site 24 over a customer telephone loop 22 comprising twisted-pair copper wire. The PSTN 14 includes, for example, those public switched telephone networks provided by AT&T, the Regional Bell Operating Companies (e.g., Ameritech, U.S. West, Bell Atlantic, Southern Bell Communications, Bell South, NYNEX, and Pacific Telesis Group), GTE, and others.

A concentrator 16 receives the digital data communications. The concentrator 16 is typically located at a telephone company's central office ("CO"). The data network 12 may be a local area network ("LAN"), a wide area network ("WAN"), or combination of the foregoing. For example, data network 12 may be the Internet and the concentrator 16 may be a network hub that receives Internet Protocol packets and routes them to a particular network device connected to the network hub. Alternatively, the concentrator 16 may be a DSL Access Multiplexer ("DSLAM") that links many ADSL data lines to the data network 12. The concentrator 16 sends the data intended for the customer site 24 to an ADSL Transceiver Unit 18 ("ATU"), which converts it to an ADSL signal.

A functional description of the conversion of data to an ADSL signal in the ATU 18 is to be found in ITU-T Recommendation 992.2. The ATU 18 takes the data from the concentrator 16 and frames the data. Thereafter, the ATU 18 applies a cyclic redundancy check, scrambling, forward error correction, coding and interleaving. The ATU 18 then combines the data stream into a data symbol that is input to a constellation encoder. After constellation encoding, the ATU 18 modulates the data to produce an analog signal for transmission to the customer site 24 across the customer loop 22 via the splitter 20. The G.Lite signal permits high-speed downstream transfer of digital data from the central office to the customer site 24 at rates up to 1.536 Megabits per second ("Mbps"), depending primarily upon the length of the customer loop 22.

The G.Lite high-speed downstream signal occupies a frequency range of approximately 138 to 552 kiloHertz ("kHz"). Analog voice signals from the PSTN 14, in contrast, occupy a low frequency range of approximately zero to 4 kHz. A frequency splitter 20 in the central office combines the high frequency G.Lite signal from the ATU 18 and the low frequency analog signal from the PSTN 14. The splitter 20 then sends the combined signal over the customer loop 22 to the customer site 24.

At the customer site 24, the customer loop 22 from the central office connects to copper wiring within the customer site 24. For example, the copper wiring may be an internal home wiring system having multiple standard wall telephone outlets. A POTS telephone 30 and an ADSL modem 26 may be attached to the same internal copper wiring. Importantly, in the G.Lite version of ADSL, the customer site 24 does not have a splitter for isolating the POTS analog signal from the high-frequency G.Lite signal. Thus for splitterless ADSL, both POTS telephones 30 and ADSL modems 26 may be plugged into the same standard telephone outlets, thereby avoiding the expense and delay of a visit by a technician from the telephone company for the purpose of installing the splitter. The ADSL modem 26 demodulates the G.Lite signal into data, and forwards the data to customer premise equipment 28, e.g. a personal computing, multimedia, or video device.

Similarly, in the upstream channel from the customer site 24 to the central office, the ADSL modem 26 may receive data from the customer premise equipment 28 and convert the data to an ADSL signal which the modem 26 places on the customer loop 22. At the same time, the telephone 30 may be off-hook while it sends analog voice signals to the PSTN 14 via the customer loop 22. These analog voice signals from the telephone 30 are typically in the low frequency range of approximately zero to 4 kHz. The G.Lite upstream signal, however, occupies a higher frequency range of approximately 26 to 134 kHz, providing medium-speed upstream data transfer at rates up to 512 kilobits per second ("kbps"). The customer loop 22 carries both the high frequency G.Lite signal from the ADSL modem 26 and the low frequency analog signal to from the telephone 30 to the central office.

At the central office, the splitter 20 passes the low-frequency analog signals to the PSTN 14 and passes the high-frequency G.Lite signal to the ATU 18. The ATU 18 demodulates the G.Lite signal into data, passes the data to the concentrator 16, which then sends the data to the data network 12.

An operating environment for the modems and ATUs of the preferred embodiments, such as the ADSL modem 26 and the ATU 18, includes a processing system with at least one Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions may be referred to as being "computer-executed" or "CPU executed."

One of ordinary skill in the art will appreciate that the acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. Examples of computing platforms which may support the preferred embodiments include the "Office Connect 811" ADSL router platform of the 3Com Corporation of Santa Clara, Calif. Other platforms that may support the preferred embodiments typically incorporate a "C6x" series Digital Signal Processor ("DSP") manufactured by Texas Instruments of Dallas, Tex., as their CPUs. Other CPUs on which the preferred embodiments may run include the "1827" DSP manufactured by Analog Devices of Norwood, Mass. However, it should be understood that the preferred embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Discrete Multi-Tone modulation

The ADSL modem 26 and the ATU 18 modulate data for transmission as a G.Lite signal and demodulate a received G.Lite signal back into data. It is understood that in a typical ADSL configuration, each end of the communication channel uses both a transmitter and a receiver, making an ADSL transceiver. An ADSL transmitter typically employs a multi-carrier modulator, utilizing Discrete Multi-Tone ("DMT") modulation. The DMT modulator typically maps the data values to symbols specified by the magnitude and phase of each carrier, and then performs an inverse discrete Fourier transform ("IDFT") over a symbol frame. The transceiver then transmits the time domain sequence over the customer loop 22; the time domain sequence also includes the effects of the subscriber line twisted pair wire and the analog components and amplifiers of the analog front ends of the ADSL transceivers. At the other end of the communication channel, an ADSL receiver demodulates the signal back into data.

An ADSL receiver includes a DMT demodulator. The demodulator typically uses a discrete Fourier transform ("DFT"), for which there are many algorithms, to recover the magnitude and phase of each carrier, and thereby recover the symbols. As is known in the art, DMT is a method for dividing the available G.Lite bandwidth into 128 sub-channels over the 0 to 552 kHz bandwidth. Essentially, DMT splits the available bandwidth into a large number of sub-channels, each associated with a "bin" that is 4.3125 kHz wide. The frequency response of the customer loop 22 means that some bins have a higher data transport capacity compared to other bins. Data transport capacity is limited by noise on the customer loop 22, including external radio-frequency sources, thermal noise, and cross-talk from other customer loops. By measuring the frequency response of the customer loop 22, the ATU 18 and modem 26 may determine the data carrying capacity of each sub-channel. In this manner, DMT may allocate data so that the throughput of each sub-channel is maximized.

Figure 2:
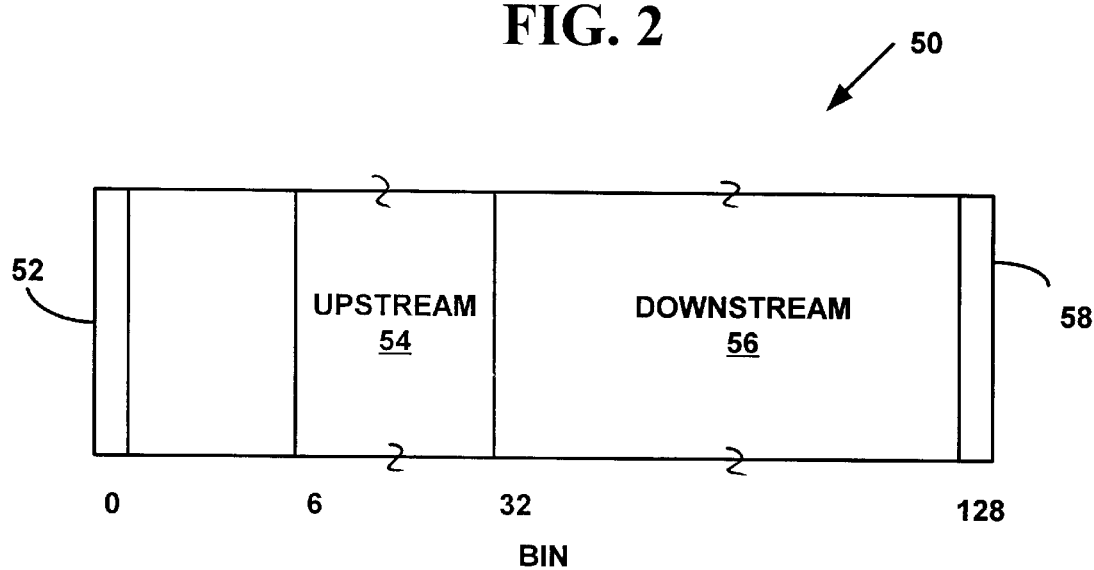
FIG. 2 is a diagram illustrating an available bandwidth for a splitterless ADSL modem.

FIG. 2 is a diagram illustrating the available bandwidth 50 for G.Lite modems such as the ADSL modem 26. Bins 0 to 5, corresponding to 0 to 25.875 kHz, are reserved for POTS signaling 52. The modem 26 transmits upstream data 54 in bins 6 to 31, corresponding to 25.875 kHz to 138 kHz. With the inclusion of echo canceling, these bins may also permit medium speed downstream transfer. In the other direction, the ATU 18 transmits downstream data 56 in bins 32 to 127, corresponding to 138 kHz to 552 kHz. Finally, bin 128 corresponds to the Nyquist frequency 58 for the ADSL signal and no data is transmitted in this bin.

An Initialization Sequence procedure, also known as an initialization procedure, occurs with G.Lite modems to determine attributes of the connecting channel and to establish transmission and processing characteristics suitable to that channel. As known to those skilled in the ADSL art, during the Initialization Sequence procedure, the ATU 18 and ADSL modem 26 exchange expected far-end transmitter settings. Typically, they communicate to each other's far-end transmitter the number of bits and relative power levels that are to be used on each DMT subcarrier. Each transceiver produces and responds to a specific set of precisely timed signals, and determines channel attributes and establishes transmission characteristics. A successful Initialization Sequence procedure results in the ATU 18 and ADSL modem 26 reaching a data transfer mode, known as "Showtime." Once the ATU 18 and ADSL modem 26 reach Showtime, they have established modulation schemes for the channel attributes. The ATU 18 and ADSL modem 26 store these modulation schemes, which they may select again during a Fast Retrain procedure.

A Fast Retrain procedure occurs in G.Lite modems to adapt transmission characteristics to changing customer loop 22 conditions, such as may be caused by telephone 30 on/off hook transitions. As known to those skilled in the ADSL art, during the Fast Retrain procedure the ATU 18 sends a predetermined series of tones to the ADSL modem 26. The modem 26 at the other end of the customer loop 22 receives the tones and measures the power of the signal received in each bin. From these measurements, the modem 26 may determine the frequency response of the customer loop 22. From this, the modem 26 determines the signal-to-noise ratio ("SNR") in each bin and hence derives a value for the maximum data throughput for that bin. The modem 26 may then independently select a downstream modulation scheme from a set of previously negotiated modulation schemes to optimize the throughput for the downstream transmission bins.

Similarly, the modem 26 sends a predetermined series of tones which are received by the ATU 18. The ATU 18 may also determine the maximum data throughput for each bin. The ATU 18 may then independently select an upstream modulation scheme from a set of previously negotiated modulation schemes to optimize the throughput for the upstream transmission bins. During the above-described Fast Retrain procedure, the modem 26 and the ATU 18 set power levels for transmission to and from each other.

Audible noise reduction

The ADSL modem 26 generates audible noise in the telephone 30 when the telephone 30 is off hook. The DMT transmissions from the modem 26 reach the telephone 30 through the local telephone loop 22 and interact with the electronics in the telephone 30. This interaction with the telephone 30 electronics in the absence of a splitter at the customer site 20 is the most common source of the audible noise. Unless the power of the modem 26 output signal is cut back, the customer may be unable to use the telephone 30 whilst simultaneously transferring data from the modem 26 because the audible noise is overwhelming.

The level of audible noise generated in the telephone 30 is dependent on the model of telephone. Some telephones are noisier than others. The degree of power cutback of the modem 26 required to suppress the audible noise is dependent on the model of telephone. Quieter models of telephones include: General Electric models 2-9221 and 2-9295; Lucent/AT&T models 210 and 9200; Bell South model 33012; and White-Westinghouse model WNCP-440. Once the transmitted power from the modem 26 is cut back by the required amount, the user may use the telephone 30 and the modem 26 simultaneously.

Figure 3:
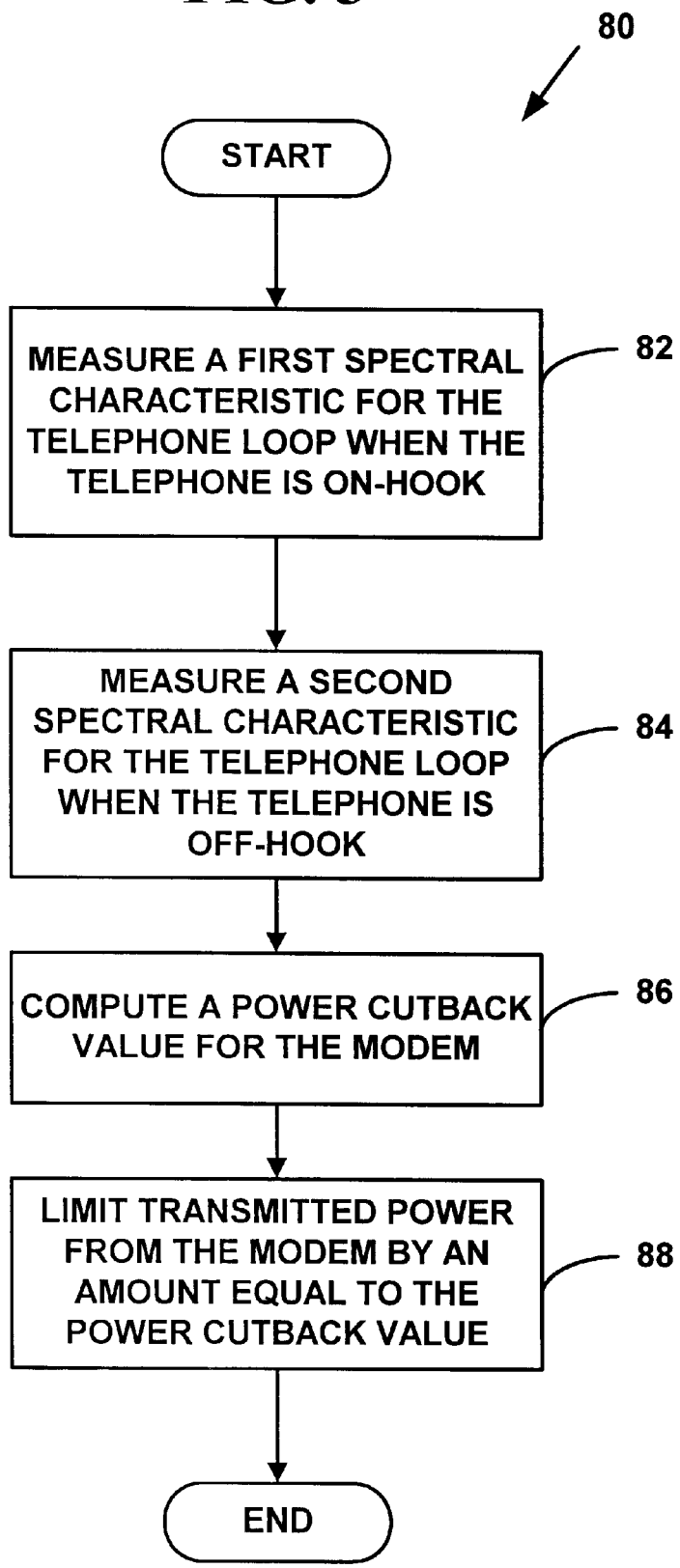
FIG. 3 is a flow diagram illustrating a method for reducing noise in a telephone from a splitterless ADSL modem.

FIG. 3 is a flow diagram illustrating a preferred method 80 for reducing audible noise in a telephone 30 from a splitterless Asymmetric Digital Subscriber Line modem 26. The telephone 30 and the modem 26 share a telephone loop 22. At step 82, a first spectral characteristic is measured, by the modem 26, for the telephone loop 22 when the telephone 30 is on-hook. A second spectral characteristic for the telephone loop 22 is measured, by the modem 26, when the telephone 30 is off-hook at step 84. At step 86, a power cutback value for the modem 26 is computed. The power cutback value is determined from the first spectral characteristic and the second spectral characteristic. At step 88, transmitted power from the modem 26 is limited by an amount equal to the power cutback value. In this manner, audible noise in the telephone 30 from the modem 26 is substantially reduced, enabling simultaneous use of the telephone 30 and the modem 26.

The power cutback required to suppress the audible noise depends on the quality of telephone 30 in the customer loop 22. The modem 26 may distinguish between a noisy telephone and a quiet telephone. In one exemplary preferred embodiment of the present invention, the modem 26 ascertains the quality of the telephone 30 with which it shares a local telephone loop 22 by monitoring Fast Retrain signals from the ATU 18. Fast Retrain, as mentioned above, are a series of tones, power levels, and procedures that allow G.lite modems to modify their transmission characteristics before entering a data transfer mode. The modem 26 monitors Fast Retrain signals while the telephone 30 is on-hook, corresponding to step 82, and again while the telephone 30 is off-hook corresponding to step 84. A comparison of both signals may indicate how the presence of the telephone 30 influences transmission characteristics of the local customer loop 22 and provides an indication of the quality of the telephone 30.

Spectral characteristics

A Fast Retrain procedure may be initiated by either the ATU 18 or the ADSL modem 26. In accordance with preferred embodiments, a Fast Retrain procedure may be initiated by the ADSL modem 26 under two circumstances. A first circumstance is when the modem 26 is starting up and the ATU 18 and modem 26 perform the Initialization Sequence procedure as described above. During this procedure, the modem 26 requests an entry to Fast Retrain for the purpose of measuring a spectral characteristic of the customer loop 22 when the telephone 30 is not in the circuit, i.e. the telephone 30 is on-hook. In one exemplary preferred embodiment, the spectral characteristic referred to in step 82 is the slope of a C-REVERB-FR1 signal's envelope when the telephone 30 is on-hook. Hardware on the modem 26 determines whether the telephone 30 is on- or off-hook. This entry is made from a handshake protocol, known to those skilled in the art as "G.hs," which is running on the CPU in the modem 26. C-REVERB-FR1 is described in Section 12 of ITU-T Recommendation G.992.2, and G.hs is described in ITU-T Recommendation G.994.1 which is incorporated herein by reference.

The second circumstance for Fast Retrain is when the ATU 18 and modem 26 are in the Showtime data transfer mode, known to those familiar with G.992.2. If the modem 26 detects the telephone 30 going off-hook, it initiates the Fast Retrain procedure, according to the guidelines in Section 12.3 of G.992.2, for the purpose of measuring a spectral characteristic of the customer loop 22 when the telephone 30 is in the circuit, i.e. the telephone 30 is off-hook. In another exemplary preferred embodiment, this spectral characteristic is also the slope of the C-10 REVERB-FR1 signal's envelope, only now in the off-hook condition, corresponding to the spectral characteristic referred to in step 84. Upon detection of the telephone 30 going off-hook, the modem 26 stops sending data and begins sending a R-RECOV signal. R-RECOV is a single tone signal corresponding to sub-carrier bin 20 without a cyclic prefix. R-RECOV is transmitted by the modem 26 at nominal power (−38 deciBels below one milliwatt per Hertz ("dBm/Hz")). When the ATU 18 detects the R-RECOV signal, it stops sending data and begins sending a C-RECOV signal. C-RECOV is a single tone signal corresponding to sub-carrier bin 68 without a cyclic prefix accompanied by a pilot sub-carrier in bin 64. The C-RECOV signal is transmitted by the ATU 18 at nominal power (−40 dBm/Hz). C-RECOV is sent for exactly 64 symbols, at which point the ATU 18 begins sending C-REVERB-FR1.

The modem 26 controls the length of the C-REVERB-FR1 signal. The ATU 18 continues to send the C-REVERB-FR1 signal until it receives the R-REVERB-FR1 for at least 32 symbols. The modem 26 continues to send R-RECOV while it measures the slope of the envelope of the C-REVERB-FR1 signal. In practice, the modem 26 only needs 64 symbols worth of the C-REVERB-FR1 signal to effectively characterize the slope of the envelope, at which point it would transition to sending the R-REVERB-FR1 signal in order to continue the Fast Retrain process with the ATU 18.

Figure 4:
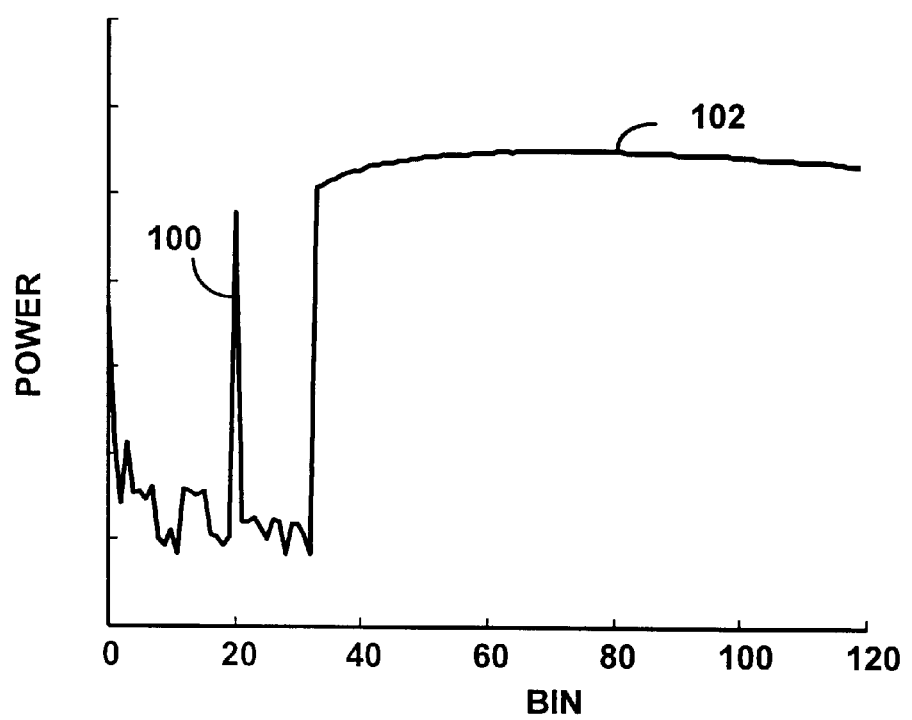
FIG. 4 is a graph illustrating an envelope of a typical on-hook C-REVERB-FR1 signal.

FIG. 4 is a graph illustrating an envelope 102 of a typical on-hook C-REVERB-FR1 signal. This signal was measured by an ADSL modem 26 on a 24 American Wire Gauge "AWG") telephone line that is 4000 feet long. In this Figure, the upstream bins are from 6 to 31 and the R-RECOV tone 100 can be seen at bin 20. The envelope 102 represents a distribution of power measured by the modem 26 upon receiving the C-REVERB-FR1 tones from the ATU 18. The power is measured logarithmically with respect to a nominal power value.

The slope of the envelope 102 may be measured in several ways known to those skilled in the art. In one exemplary preferred embodiment, logarithmic power values may be measured for multiple bins and a straight-line fit performed to estimate the slope of the envelope 102. In another exemplary preferred embodiment, logarithmic power values may be measured for only two bins and a slope estimated from the two measurements. For example, the two bins may be chosen to be bin 51 corresponding to a lower frequency in the envelope 102 and bin 120 corresponding to a higher frequency in the envelope 102. An estimate for the slope of the envelope 102 may be derived from Equation 1.

$$\frac{\log(\text{Average Power in Bin } 120) - \log(\text{Average Power in Bin } 51)}{120 - 51} \tag{1}$$

The average power in each bin is calculated by squaring the real and imaginary values produced by a Fast Fourier Transform ("FFT") process, and adding the two values together. Accumulating these values over 64 symbols for both bin 51 and bin 120, and dividing each of these results by 64 yields the average power in each of these bins. For example, the slope of the envelope 120 for the on-hook telephone 30 measured by the modem 26 on a 24 American Wire Gauge ("AWG") telephone line that is 4000 feet long is typically found to be approximately −0.012 deciBels per bin ("dB/bin").

In another exemplary preferred embodiment, an estimate of the quality of the telephone 30 may be made by computing a difference between the slope of the C-REVERB-FR1 signal while the telephone 30 is on-hook and the slope of another C-REVERB-FR1 signal while the telephone 30 is off-hook. The difference in slope between the on-hook and off-hook values is typically independent of the length of the loop 22 because we are taking a difference between logarithms of average power. We have determined that if the slope difference satisfies Equation 2, then telephone 30 is typically a noisy telephone.

$$\text{Slope(on-hook)} - \text{Slope(off-hook)} > 0.036 \text{ dB/bin} \qquad (2)$$

Equivalently, expressed in other units, the slope difference is $8.4 \times 10^{-3}$ dB/kHz.

Power cutback

Equation 2 sets an approximate threshold for determining the quality of the telephone 30 on the customer loop 22 with the modem 26. In one exemplary preferred embodiment of the present invention, a noisier telephone 30, i.e. where the slope satisfies Equation 2, requires a cutback of approximately 24 dB in power transmitted by the modem 26 in the upstream bandwidth 54 to suppress the audible noise. The power cutback value is measured with respect to the nominal transmitted power value of −38 dBm/Hz for the modem 26. In another exemplary preferred embodiment, a quieter telephone 30, i.e. where the slope does not satisfy Equation 2, only requires a power cutback of approximately 12 dB by the modem 26. The power cutback may be applied during an R-REVERB-FR3 period of Fast Retrain. However, it should be understood that the present invention is not restricted to these power cutback values and that other values are possible. Moreover, it should be understood that the present invention is not restricted to the method 80 of power cutback of FIG. 3 and that other methods of implementing a power cutback are possible.

Downstream noise reduction

The ADSL modem 26 generates downstream noise when the telephone 30 is off-hook. The upstream DMT transmissions from the modem 26 reach the telephone 30 through the local telephone loop 22 and interact with the electronics in the telephone 30. This interaction with the telephone 30 electronics in the absence of a splitter at the customer site 20 is the most common source of the downstream noise. Also, the level of downstream noise generated in the telephone 30 depends on the model of telephone. Unless the modem 26 cuts back the power of its output signal, the customer may not obtain an optimal rate for the receiving data from the ATU 18 whilst simultaneously using the telephone 30 because the downstream noise seriously degrades the downstream data transfer.

Figure 5:
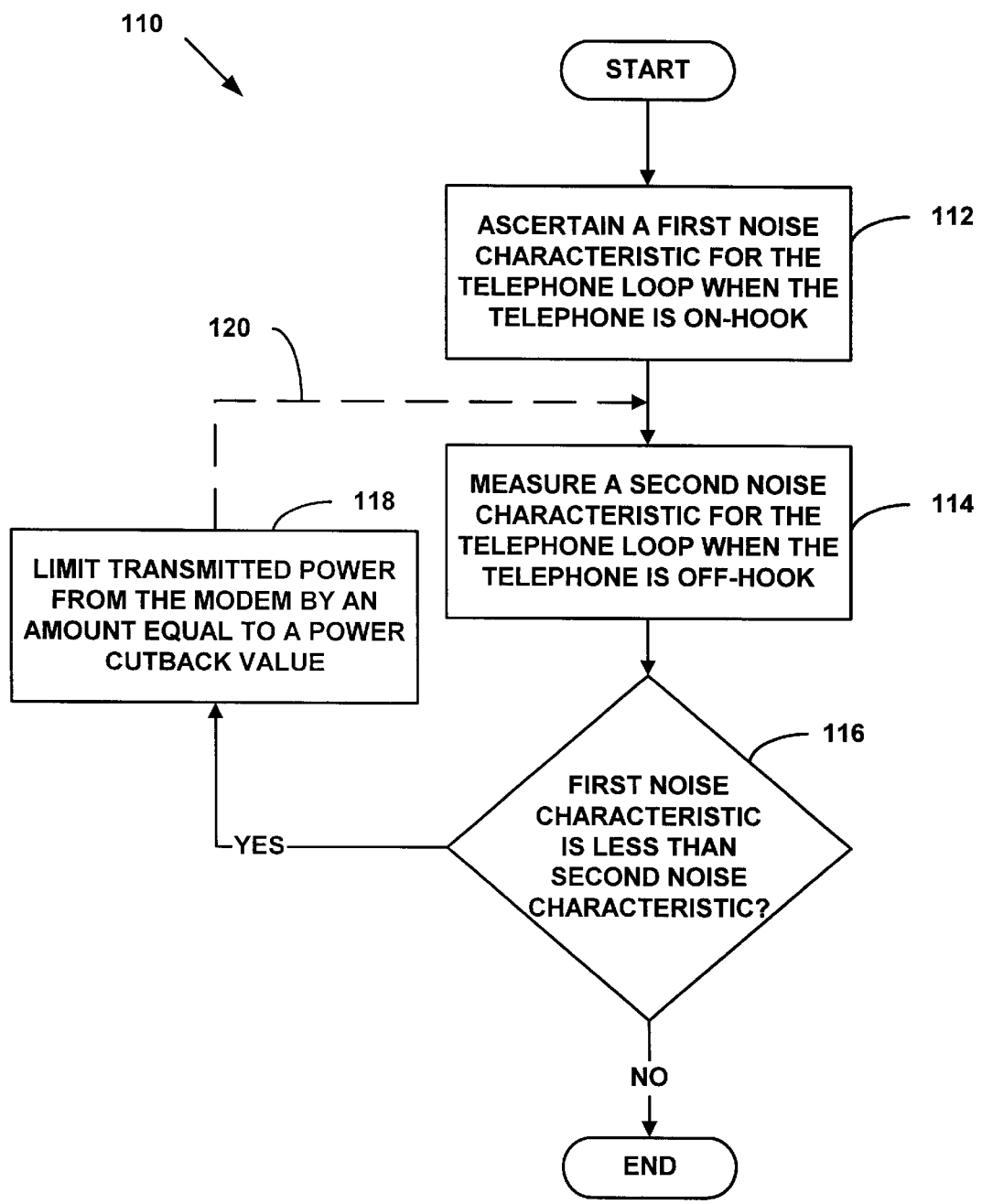
FIG. 5 is a flow diagram illustrating a method for reducing downstream noise from a telephone in the splitterless ADSL modem.

FIG. 5 is a flow diagram illustrating a preferred method 110 for reducing downstream noise from a telephone 30 in a splitterless Asymmetric Digital Subscriber Line modem 26. The telephone 30 and the modem 26 share a telephone loop 22. At step 112, the modem 26 ascertains a first noise characteristic for the telephone loop 22 when the telephone 30 is on-hook. The modem 26 measures a second noise characteristic for the telephone loop 22 when the telephone 30 is off-hook at step 114. At step 116, the modem 26 determines whether the first noise characteristic is less than the second noise characteristic. If the first noise characteristic is less than the second noise characteristic, the modem 26 limits its transmitted power by an amount equal to a power cutback value. In this manner, the method 80 may enable simultaneous use of the telephone 30 and the modem 26 while optimizing downstream data transfer.

The degradation of downstream data transfer occurs because the upstream transmissions from the modem 26 interact with the electronics of the telephone 30, while the telephone 30 is off-hook, and manifest themselves in the downstream band as noise. This noise interferes with legitimate downstream data transmissions, causes transmission errors, and hence reduces the data transfer rate.

In another preferred method, illustrated in FIG. 5, the modem 26 repeats 120 the measuring step 114 and the determining step 116 until the first noise characteristic is greater than the second noise characteristic. This preferred method cuts back the power transmitted upstream from the modem 26 in steps until the noise level in the downstream band is sufficiently low that the downstream signal is no longer substantially degraded when the telephone 30 is off-hook.

To determine how far back to cut the modem's 26 power, the modem 26 compares a noise characteristic for the downstream band when the telephone 30 is off-hook with a baseline noise characteristic for when the telephone 30 is on-hook at step 116. Typically, the telephone 30 does not introduce noise into the customer loop 22 when it is on-hook because the telephone 30 is not connected to the loop 22. Thus the on-hook noise characteristic provides the baseline for the noise on the customer loop 22 in the downstream band. An optimal downstream data transfer may occur when the telephone 30 is on-hook and transferring data in this baseline noise environment. When the telephone 30 goes off-hook, however, optimal downstream data transfer may not occur unless the off-hook noise is not substantially greater than the on-hook noise baseline. Therefore, the modem 26 may cut back its transmitted power in steps until the off-hook noise in the downstream band is not more than the on-hook noise in order to restore optimal data transfer.

Noise characteristics

In a preferred embodiment, the modem 26 measures the on- and off-hook noise characteristics in response to Fast Retrain tones. Fast Retrain, as mentioned above, is a series of tones, power levels, and procedures that allow G.lite modems to modify their transmission characteristics before entering a data transfer mode. As described above, Fast Retrain may occur during an Initialization Sequence procedure or in response to detecting an off-hook telephone 30 during Showtime. Either the ATU 18 or the ADSL modem 26 may initiate a Fast Retrain procedure.

In one exemplary preferred embodiment, the first noise characteristic referred to in step 112 is the total power measured by the modem 26 in the downstream band when the telephone 30 is on-hook and while the modem 26 is transmitting R-MEDLEY tones. In accordance with this preferred embodiment, the modem 26 measures the total power when it is repeatedly transmitting the thirty-eighth symbol of the R-MEDLEY series of tones. R-MEDLEY is described in Section 11 of ITU-T Recommendation G.992.2.

Hardware on the modem 26 determines whether the telephone 30 is on- or off-hook. Upon detecting that the telephone 30 has gone off-hook, the modem 26 stops sending data and begins sending an R-RECOV signal. R-RECOV is a single tone signal corresponding to subcarrier bin 20 without a cyclic prefix. The modem 26 transmits R-RECOV at its nominal power (−38 deciBels below one milliwatt per Hertz ("dBm/Hz")). When the ATU 18 detects the R-RECOV signal, it stops sending data and begins sending a C-RECOV signal. C-RECOV is a single tone signal corresponding to sub-carrier bin 68 without a cyclic prefix accompanied by a pilot sub-carrier in bin 64. The ATU 18 transmits the C-RECOV signal at its nominal power (−40 dBm/Hz). The ATU 18 sends the C-RECOV for exactly 64 symbols, at which point the modem 26 and the ATU 18 begin exchanging the Fast Retrain signals.

Alternatively, if the modem 26 detects the telephone 30 going off-hook during Showtime, it initiates the Fast Retrain procedure according to the guidelines in Section 12.3 of ITU-T Recommendation G.992.2. The modem 26 initiates the Fast Retrain procedure for purpose of measuring a downstream noise characteristic of the customer loop 22 when the telephone 30 is in the circuit, i.e. the telephone 30 is off-hook. As is known in the art, G.992.2 defines Fast Retrain to include an R-LINE-PROBE section, which may be defined by a vendor. In one preferred embodiment, the modem 26 transmits an R-MEDLEY signal during the R-LINE-PROBE section of the Fast Retrain procedure. In accordance with this preferred embodiment, the R-MEDLEY signal is the thirty-eighth symbol of the R-MEDLEY series of tones. In this way, the modem 26 may measure the second noise characteristic for the off-hook downstream channel in the same manner as it ascertained the first noise characteristic for the on-hook downstream channel. In another exemplary preferred embodiment, the second noise characteristic referred to in step 84 is also the total power measured by the modem 26 in the downstream band when the modem 26 is transmitting this R-MEDLEY series of tones, only now with the telephone 30 in the off-hook condition.

Figure 6:
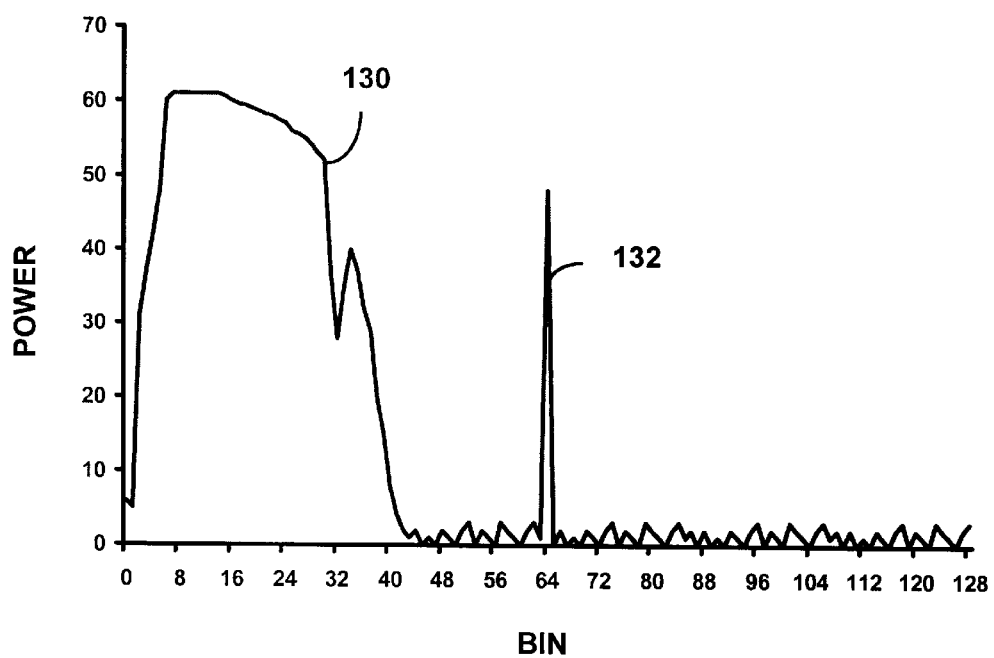
FIG. 6 is a graph illustrating an envelope of a typical R-MEDLEY signal for an on-hook telephone.

FIG. 6 is a graph illustrating an envelope 130 of a typical R-MEDLEY signal for the case in which the telephone 30 is on-hook. The envelope 130 represents a distribution of power measured at the modem 26 that is measured logarithmically with respect to the nominal power value. The signal illustrated in FIG. 6 is that measured at an ADSL modem 26 on a 24 American Wire Gauge ("AWG") telephone line that is 4000 feet long. As shown in FIG. 6, the modem 26 transmits the R-MEDLEY signal in the upstream bins 7–32, and the ATU 18 transmits a pilot signal C-PILOT 132 at bin 64. Bins 44–71, in contrast, represent a part of the downstream signal spectrum over which the signal is reasonably quiet and stable. The modem 26 may therefore exploit this stability and may examine this part of the spectrum to determine the level of noise in the downstream channel.

Power cutback

In another preferred embodiment, the noise characteristic of the telephone loop 22 is a measure of how much power is in bins 44–71, while the modem 26 transmits a series of R-MEDLEY tones. In accordance with this preferred embodiment, the modem 26 measures the power while transmitting the thirty-eighth symbol of the R-MEDLEY series of tones. The modem 26 ascertains the power in these bins while the telephone 30 is on-hook, corresponding to step 112. This measurement provides a baseline for the downstream noise. The modem 26 again measures the power in the downstream band, but this time while the telephone 30 is off-hook corresponding to step 114. A comparison of both power measurements may indicate how the presence of the telephone 30 influences downstream transmission characteristics of the local customer loop 22 by bleeding some of the upstream signal into the downstream channel.

The power density in each bin is calculated by squaring the real and imaginary values produced by a Fast Fourier Transform ("FFT") process, and adding the two values together. Accumulating these values over 54 repetitions of the R-MEDLEY symbol from bin 44 to bin 71, the modem 26 may derive a value for the average power density in each bin. The modem 26 may sum these average power densities over bins 44 through 71 to obtain a value for the total power in the downstream signal spectrum. In another preferred embodiment, the modem 26 may convert the value of the total power to a logarithmic power value, as is known to those skilled in the art of ADSL modems. For example, the modem 26 may convert the total power value by taking a base two logarithm of the total power value and multiplying by a conversion factor. In yet another preferred embodiment, the modem 26 may add an offset power value to the logarithmic power value to compensate for platform-dependent fluctuations in the noise floor. For example, the offset power value for the Office Connect 811 platform is 0.75dB.

In another preferred embodiment, the modem 26 does not include the power of the pilot tone 132 in the summation. Thus the modem 26 determines the quality of downstream transmission from the ATU 18 by measuring how much the R-MEDLEY signals interact with the telephone 30 and bleed into the downstream channel.

At step 116 of the method 110, the modem 26 compares the two noise characteristics to determine whether it should cut back its transmitted power. In accordance with the above-described preferred embodiments, the modem 26 compares the total power value summed from bin 44 to bin 71 for when the telephone 30 is off-hook with the total power value summed from bin 44 to bin 71 for when the telephone 30 is on-hook. If the off-hook power value is greater than the on-hook power value, there is still too much signal bleeding into the downstream band and corrupting the downstream data transfer from the ATU 18. Thus the modem 26 may cut back the power of its upstream transmissions to reduce the amount of noise interfering with the downstream transmissions.

The modem 26 implements the power cutback at step 118. In one exemplary embodiment, the modem 26 cuts back its transmitted power by approximately four decibels each time it is required to do so. The power cutback value is measured with respect to the nominal transmitted power value of −38 dBm/Hz for the modem 26. The modem 26 repeats measuring the off-hook noise characteristic and determining, at step 116, whether the associated power value is less than the on-hook power value. If the power value is not less than the on-hook power value, the modem 26 again cuts back its transmitted power by approximately another four decibels. Steps 114, 116, and 118 are preferably repeated until the off-hook noise characteristic is less than or equal to the on-hook noise characteristic. Once the off-hook noise characteristic is less than or equal to the on-hook noise characteristic, the downstream noise may be lower than when the on-hook baseline noise level, thus providing optimal data transfer in the downstream direction.

Figure 7:
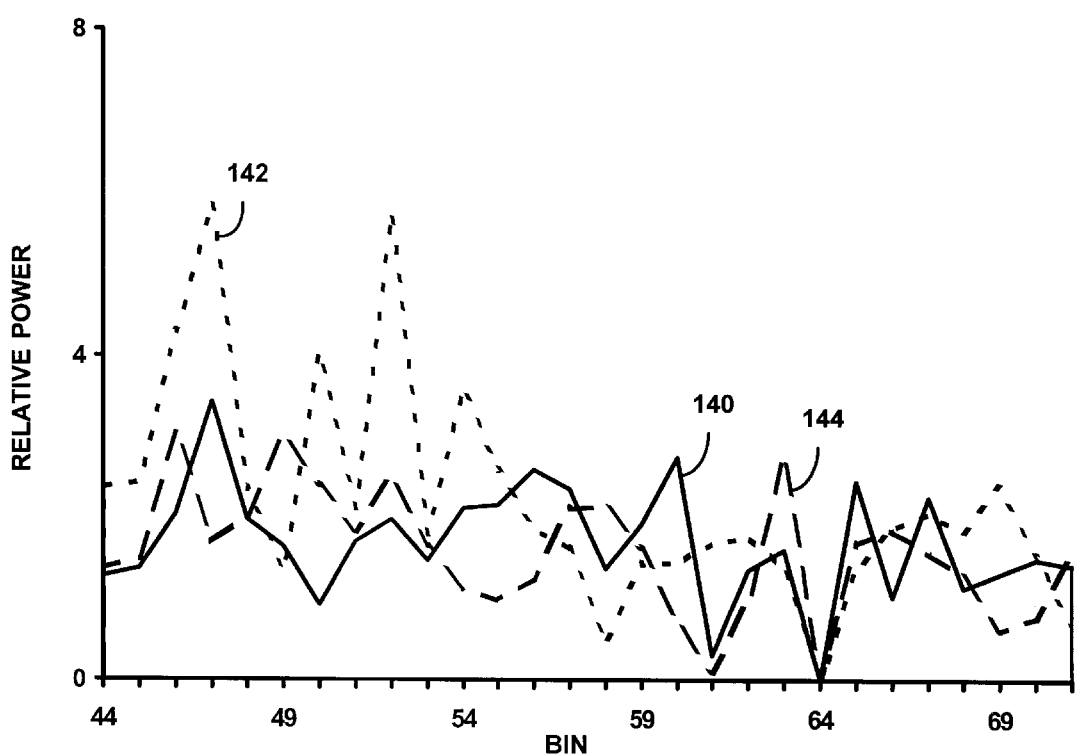
FIG. 7 is a graph illustrating the relative powers of the downstream noise for an on-hook telephone and an off-hook telephone during power cutback.

As an illustrative example, FIG. 7 is a graph illustrating the relative powers of the downstream noise for an on-hook telephone 30 and an off-hook telephone 30 during power cutback. The solid line 140 illustrates a distribution of power of downstream noise when the telephone 30 is on-hook. The dotted line 142 illustrates a distribution of power of downstream noise when the telephone 30 is off-hook and the modem 26 is subject to a 12 dB power cutback. This level of power cutback may be achieved by the method 110 for power cutback. As may be determined from a comparison of the on-hook noise distribution 140 and the 12 dB power cutback noise distribution 142, the total power of the noise from the cutback modem 26 is still greater than the total power of the noise when the telephone 30 is on-hook. The modem 26 may apply another power cutback according to the method 110. The dashed line 144 illustrates a distribution of power of downstream noise when the telephone 30 is off-hook and the modem 26 is subject to a 16 dB power cutback. Now, as may be determined from a comparison of the on-hook noise distribution 140 and the 16 dB power cutback noise distribution 144, the total power of the noise from the cutback modem 26 is less than the total power of the noise when the telephone 30 is on-hook. Therefore, in this illustrative example, the 16 dB power cutback may be sufficient to reduce downstream noise that the user may use the modem 26 and the telephone 30 simultaneously.

The method 110 may perform any and all cut backs during the R-LINE-PROBE section of Fast Retrain. In a preferred embodiment, each cycle around the steps 114, 116, and 118 of the method 110 takes 62 repetitions of the thirty-eighth symbol of the R-MEDLEY series of tones. During the first 62 repetitions, the modem 26 measures the power density values in the bins of the downstream spectrum, such as between bin 44 and bin 71, and sums the measured value to obtain the power value. If the downstream noise characteristic is still larger than the on-hook noise characteristic, the modem 26 takes another 62 repetitions of the thirty-eighth symbol to perform another measurement and power cutback. The maximum cutback may be 24 dB from the nominal power level before the modem's 26 power is too low to successfully attain Showtime.

However, it should be understood that the present invention is not restricted to these power cutback values and that other values are possible. Moreover, it should be understood that the present invention is not restricted to the method 110 of power cutback of FIG. 5 and that other methods of implementing a power cutback are possible.

Rapid noise reduction

As described above, the modem 26 and ATU 18 exchange expected transmitter settings during the Initialization Sequence procedure in order to determine what transmission attributes and characteristics of the upstream and downstream channels are necessary to reach Showtime. As is known to those of ordinary skill in the ADSL art, once the ATU 18 and the modem 26 achieve Showtime, the modem 26 stores the settings of its upstream transmitter as a "profile" in the modem's 26 memory. Similarly, the ATU 18 stores the settings of its downstream transmitter as a profile in the ATU's 18 memory. A profile typically includes the number of bits and relative power levels that are used on each DMT subcarrier during Showtime, also known as "bits and gains" ("B&G") to those of ordinary skill in the art. The profile also typically includes forward error correction ("FEC") parameters and other transmission attributes that are necessary for attaining Showtime. Upon determining their respective profiles, the modem 26 and ATU 18 associate separate identification numbers with their respective profiles and store the numbers with the profiles. Each device may have stored several profiles in its memory. Typically, the profiles are stored as entries in a profile table. Each entry corresponds to a profile and its associated identification number.

Typically, modem 26 sets the transmission power level before transmitting the R-MEDLEY set of Fast Retrain tones. During R-MEDLEY, the ATU 18 measures the transmission characteristics of the upstream channel in response to the R-MEDLEY tones and searches its profile table to determine whether the measured transmission characteristics are similar to any stored transmission characteristics. However, the modem 26 may have cut back its power level to such an extent, in order to reduce audio and downstream noise as described above, that the ATU 18 is unable to complete the Fast Retrain successfully. Alternatively, the modem 26 may not have been able to previously attain Showtime and thus store the transmission characteristics. If the ATU 18 cannot complete Fast Retrain, the modem 26 recovers by executing G.hs, performing a Fast Retrain, and increasing its power level. The modem 26 repeats the recovery until it attains Showtime. The modem 26 may make many repetitions of the recovery until it finally attains Showtime, thus introducing a large delay in service while attempting to configure to a suitable transmitter power level.

To avoid the delay, the modem 26 may measure transmission characteristics of the upstream channel such as the spectral characteristics and/or the noise characteristics and compare these transmission characteristics to values for which the modem 26 was successful in reaching Showtime. If the modem 26 has encountered similar transmission characteristics before, as evidenced by a matching entry in a table, the modem 26 may retrieve a value for the power level of the modem's 26 transmitter that was in effect during the successful attainment of Showtime. In this manner, the modem 26 may rapidly achieve the Showtime data transfer mode because the same transmitter configuration was successful in achieving Showtime during the Initialization Sequence procedure for similar upstream channel characteristics. The modem 26 may store the table entries for the transmission characteristics and/or the power level as an extension of the profile tables described in standard G.992.2, or the modem 26 may store the table entries as separate data structures in the modem's 26 memory. Alternatively, the modem 26 may store the table entries elsewhere, e.g., in memory associated with a personal computer or other microprocessor-based device coupled to the modem 26.

FIG. 8 is a flow diagram illustrating a preferred method 150 for rapidly reducing noise from a telephone 30 in a splitterless ADSL modem 26 to enable simultaneous use of the telephone 30 and the modem 26. The telephone 30 and the modem 26 share a telephone loop 22. The method 150 includes measuring a selection of transmission characteristics for the telephone loop 22 at step 152. At step 154, the modem 26 determines whether a table entry is associated with the selection of transmission characteristics. The table entry comprises stored transmission characteristics that permit the modem 26 to achieve a data transfer mode. When the table entry is associated with the selection of transmission characteristics, the modem 26 retrieves a power level from the table entry at step 156 and configures the modem 26 to transmit at the power level at step 158. In this manner, the modem 26 may recognize characteristics of the telephone loop 22 and adopt a configuration of its upstream transmitter that had previously successfully allowed the modem 26 to attain the data transfer mode Showtime.

In the preferred method, the selection of transmission characteristics for the telephone loop 22 includes an audible noise characteristic, a downstream noise power level, or a direct current voltage level. The audible noise characteristic distinguishes telephone quality. The downstream noise power level is such that the modem reduces noise in the downstream channel when transmitting at the downstream noise power level. The direct current ("dc") voltage level is the zero frequency voltage of the telephone loop 22 as measured by the modem 26. Typically, the on-hook voltage at the modem 26 is approximately forty Volts but drops to between ten and twenty Volts, dependent on the model of the telephone 30, when the telephone 30 is off-hook. The voltage drop is in response to the telephone loop 22 providing power to the telephone 30.

The modem 26 compares one of these measured transmission characteristics, or a combination of the measured transmission characteristics, to a value or values stored in a table entry at step 154. If the measured transmission characteristic approximates a stored transmission characteristic, the modem 26 restores the stored transmission characteristics to attain Showtime rapidly. Also stored as part of the table entry is the power level for the modem 26 that was previously successful in allowing the modem 26 to attain Showtime. When retrieved from the restored table entry, the modem 26 configures itself to transmit at this power level.

When the selection of transmission characteristics includes the audible noise characteristic for the telephone loop 22, the modem 26 performs the measuring step 152 by measuring the audible noise characteristic in the same manner as the above-described steps 82 and 84 of the method 80 of FIG. 3 for reducing audible noise in the telephone 30. For example, the modem 26 measures a first spectral characteristic when the telephone 30 is on-hook, such as the slope of the envelope of C-REVERB-FR1 tones from the ATU 18 when the telephone 30 is on-hook. The modem 26 also measures a second spectral characteristic when the telephone 30 is off-hook, such as the slope of the envelope of C-REVERB-FR1 tones from the ATU 18 when the telephone 30 is off-hook. The modem 26 may measure the spectral characteristics of the telephone loop 22 by obtaining the logarithmic power received by the modem 26 in two bins, and by applying Equation 1 to calculate the slopes of the envelopes. Once the modem 26 has calculated the slopes of the envelopes, the modem may compute the audible noise characteristic by subtracting the on-hook slope from the off-hook slope. The difference of the on-hook slope and the off-hook slope may indicate the quality of the telephone 30. For example, the method 80 for reducing audible noise in the telephone 30 of FIG. 3 uses the difference to distinguish between a good quality telephone and a noisy telephone by determining whether the difference satisfies Equation 2.

In the preferred method 150 of FIG. 8, however, the modem 26 uses the audible noise characteristic to select the table entry for rapid attainment of Showtime, rather than using the audible noise characteristic to determine a power cutback value. At the determining step 154, the modem 26 scans table entries and compares the measured audible noise characteristic to a audible noise characteristic entry that is stored in each table entry. If the measured value approximates the stored value, the table entry is a match for at least one of the transmission characteristics. Preferably, if the measured audible noise characteristic, i.e. the difference of the on-hook and off-hook slopes between bins 51 and 120, is within $5.7 \times 10^{-3}$ dB/bin of the stored audible noise characteristic, the measured value is a sufficient approximation of the stored value.

When the selection of transmission characteristics includes the downstream noise power level, the modem 26 performs the measuring step 152 by ascertaining the downstream noise power level for the modem 26 in a similar manner to steps 112 and 114 of the method 110 of FIG. 5 for reducing downstream noise from the telephone 30. For example, the modem 26 measures the power in the downstream band during R-MEDLEY tones when the telephone 30 is on-hook and also when the telephone 30 is off-hook. Comparing the off-hook and on-hook values for the power in the downstream band, the modem 26 reduces transmitted power from the modem 26 until the off-hook power value is less the on-hook power value. When the off-hook power value is less the on-hook power value, the modem 26 would transmit upstream at the downstream noise power level without introducing noise into the downstream transmission from the ATU 18.

In the preferred method 150 of FIG. 8, however, the modem 26 uses the downstream noise power level to select the table entry for rapid attainment of Showtime, rather than using the downstream noise power level to determine a power cutback value. At the determining step 154, the modem 26 scans table entries and compares the measured downstream noise power level to a downstream noise power entry that is stored in each table entry. If the measured value approximates the stored value, the table entry is a match for at least one of the transmission characteristics. Preferably, if the measured downstream noise power level, i.e. the power level that would have suppressed downstream noise caused by the upstream modem 26 signal interfering with the telephone 30, is within 4 dB of the stored downstream noise power level, the measured value is a sufficient approximation of the stored value.

When the selection of transmission characteristics includes the dc voltage level, the modem 26 performs the measuring step 152 by measuring the dc voltage level of the telephone loop 22. At the determining step 154, the modem 26 scans table entries and compares the measured dc voltage level to a dc voltage entry that is stored in each table entry. If the measured value approximates the stored value, the table entry is a match for at least one of the transmission characteristics. Preferably, if the measured dc voltage level is within one third of a Volt of the stored dc voltage level, the measured value is a sufficient approximation of the stored value.

The selection of transmission characteristics may include one, two, or all three of the above-described transmission characteristics. If the selection of transmission characteristics includes more than one type of transmission characteristic, each transmission characteristic must match its corresponding stored entry in the table at step 154. In a preferred method, the modem 26 matches all three of the above selected transmission characteristics. It should be understood, however, that the present invention not restricted to transmission characteristics being the audible noise characteristic, the downstream noise power cutback, the dc voltage level, or some combination thereof. Additional transmission characteristics may be included in the selection, such as B&G and/or FEC parameters for configuring the modem's 26 receiver as initially determined by the ATU 18 in response to signals from the modem 26.

If the selection of transmission characteristics includes the audible noise characteristic and the downstream noise power level, and these parameters do not match any values stored in a table entry, the modem 26 ascertains an audible noise power level and a downstream noise power level. For example, the modem 26 may determine whether the audible noise characteristic satisfies Equation 1. If the audible noise characteristic satisfies Equation 1, the telephone 30 is a noisy telephone and the audible noise power level is approximately 24 dB below nominal power, i.e. −62 dBm/Hz. If the modem 26 transmits at this audible noise power level, the modem 26 may eliminate audible noise in the telephone 30. Similarly, if the audible noise characteristic does not satisfy Equation 1, the telephone 30 is a quiet telephone and the audible noise power level is preferably approximately 12 dB below nominal power, i.e. −50 dBm/Hz. As the modem 26 has already ascertained the downstream noise power level at step 152, the modem 26 configures itself to transmit at the lesser of the audible noise power level and the downstream noise power level. In this manner, the modem 26 reduces both the audible noise in the telephone 30 and the downstream noise in the telephone loop 22 in order that the modem 26 may attain the Showtime data transfer mode.

Typically, each table entry includes the selection of transmission characteristics and the power level. The modem 26 preferably also stores B&G parameters and FEC parameters as profiles in a profile table. In one preferred embodiment, the table entries for the selections of transmission characteristics and power level are also stored in the profile table as an extension of the profiles described in G.992.2. During the determining step 154, the modem 26 compares the measured value of the transmission characteristic with the stored table entries in the profile table. When the entries for the same profile all match the measured transmission characteristics, the modem 26 retrieves the power level from the profile and configures the modem 26 to transmit at the power level that is expected to achieve Showtime and reduce noise in the telephone 30 and downstream channel.

Storing table entries

At step 154 of the method 150 for rapid noise reduction, however, if there is no existing table entry that matches the measured transmission characteristics, the modem 26 may continue trying to attain the Showtime data transfer mode by methods familiar to those of ordinary skill in the art. For example, the modem 26 may execute the Initialization Sequence procedure described above. The modem 26 may also perform power cutbacks to suppress the audible noise in the telephone 30 and noise in the downstream channel. If these power cutbacks are too excessive, such that the modem 26 does not attain Showtime, the modern 26 may attempt to recover from the excessive power cutbacks by repeatedly increasing its power in steps until it does attain Showtime.

When the modem 26 finally attains Showtime, the modem 26 determines the power level of the modem 26, stores the transmission characteristics in a new table entry, and stores the power level in this new table entry. The new table entry may be stored as a data structure which is associated with a profile. The profile includes the B&G and/or the FEC parameters to which the modem 26 was configured when it reached Showtime. Alternatively, the modem 26 stores the table entry as an extension of the profile table described in G.992.2. Thus, if the modem 26 measures the same values of the transmission characteristics during a later Fast Retrain, it may restore the table entry and/or profile and rapidly attain Showtime.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams.

The claims should not be read as limited to the described order or elements unless stated to that effect. Therefore, all embodiments that come within the scope and spirit of the following claims and equivalents thereto are claimed as the invention.

The following software appendix includes an implementation of the above-described method. The method is performed by compiling the code and running the code on a C6x digital signal processor. However, it should be understood that other implementations may alternatively be used.

APPENDIX

```
// Author: Marty Staszak et al.
// Company: 3Com
// The following C code implements the power cutback recovery method
// as described in the detailed description. A reader of this code should
// be familiar with the following concepts: C Coding practices, basic soft-
// ware data structures, and the ITU specifications G.992.2 (G.lite) and
// G.994.1. In addition, where necessary to ensure the clarity of the power
// cutback recovery implementation, the following code includes function
// calls related to a preferred power cutback method.
#define SLOPE_THRESHOLD      4    // offhook slope comparison
                                  // threshold
#define BN_INDEX_THRESHOLD   2    // allow the BN measurement
                                  // to be within one iteration
#define DC_VOLTS_THRESHOLD   1    // allow DC voltage to be
                                  // within 1/3 volt
void TXR_LINE_PROBE( )
{
    // Setup to perform Line Probe during Fast Retrain
    // Set monitoring routine
    pMainSeq = MeasureBn;
}
void MeasureBn( )
    // Calculate estimated Transmit Power Cutback
    // if Calculation is complete
    {
        byBnTempIndex = OptimalTxPower;
        PickIndexToUse();
        ResetBn();
    }
}
void PickIndexToUse( )
{
    int8 byCnt;
    uint8 byAbsSlope;
    uint8 byAbsBnIndex;
    uint8 byAbsDcVolts;
    // Method
    // First, check to see if we have a profile which matches the
    // characteristics we've derived. Use, Slope of C_REVERB_FR1,
    // Optimal TX Power Cutback, and Dc Voltage of line.
    bProfileMatch = FALSE;
    for (byCnt = 0; byCnt < sProfileHistory.wActiveRxProfilesCnt;
    byCnt++)
    {
        if (sProfileHistory.bProfOffHook[byCnt] == bOffHook)
        {
            byAbsSlope = _abs(wCurrentSlope -
sProfileHistory.byCurrentSlope[byCnt]);
            byAbsBnIndex = _abs(sProfileHistory.byBnPowerIn-
dex[byCnt] - byBnTempIndex);
            byAbsDcVolts = _abs(sProfileHistory.byPotsDcVolts[byCnt] -
byFiltDcVolts);
                if  ((byAbsSlope <= SLOPE_THRESHOLD) &&
                    (byAbsBnIndex <= BN_INDEX_THRESHOLD)
                    &&
                    (byAbsDcVolts <= DC_VOLTS_THRESHOLD))
                {
                    bProfileMatch = TRUE;
                    byPowerIndex =
sProfileHistory.byFinalPowerIndex[byCnt];
                    byBnOptimalIndex = byPowerIndex;
                }
        }
    }
    if (bProfileMatch == FALSE)
        if (byBnTempIndex > byPowerIndex)
            byPowerIndex = byBnTempIndex;
}
void ResetBn( )
{
    // Restore previous settings
    // Clear monitoring routine
```

APPENDIX-continued

```
        pMainSeq = Suspend;
}
void RxC_REVERB_FR1h( )
{
    // Calculate the slope of the received C_REVERB_FR1
    // store it
        wCurrentSlope = CalcSlope();
}
#define ZERO_VOLT_REFERENCE 0x80    // scale is offset binary
#define IIR_ALPHA 1450              // filter coefficient =
                                    32768 * .04425
uint32 uFiltDcVoltsTmp;
uint8 byOnHookVolts;
uint8 byRawDcVolts;
uint8 byCurrentDcVolts;
far void OffHookDetect()
{
    // Assume that RRDY is checked before calling
    byRawDcVolts = uMCSP1_RxData;
    // Obtain an absolute value of the voltage reference
    byCurrentDcVolts = _abs(byRawDcVolts -
    ZERO_VOLT_REFERENCE);
    // update the average value
    uFiltDcVoltsTmp += IIR_ALPHA * (byCurrentDcVolts -
    byFiltDcVolts);
    byFiltDcVolts = (int8) (uFiltDcVoltsTmp >> 15);
}
```

We claim:

1. A method for rapidly reducing noise from a telephone in a splitterless Asymmetric Digital Subscriber Line modem, wherein the telephone and the modem share a telephone loop, to enable simultaneous use of the telephone and the modem, the method comprising the step)s of:

measuring a selection of transmission characteristics for the telephone loop, wherein the selection of transmission characteristics comprises an audible noise characteristic distinguishing telephone quality, and wherein measuring a selection of transmission characteristics comprises at least the steps of:

detecting a first plurality of tones in the modem, wherein the first plurality of tones is transmitted between a central office and the modem over the telephone loop while the telephone is on-hook;

calculating an on-hook power slope value in response to detecting the first plurality of tones, and wherein the on-hook power slope value is a measure of change of power with rising frequency for the first plurality of tones;

transmitting a second plurality of tones between the central office and the modem over the telephone loop in response to the telephone going off-hook;

detecting the second plurality of tones in the modem, wherein the second plurality of tones is transmitted between the central office and the modem over the telephone loop while the telephone is off-hook; and calculating an off-hook, power slope value in response to detecting the second plurality of tones, and wherein the off-hook power slope value is a measure of change of power with rising frequency for the second plurality of tones; and computing the audible noise characteristic as a difference between the on-hook and off-hook power slope values;

querying a table entry to determine whether the selection of transmission characteristics corresponds to previously-negotiated transmission characteristics known to cause the modem to achieve a data transfer mode;

when the selection of transmission characteristics corresponds to the previously-negotiated transmission characteristics, retrieving a power level from the table entry, and configuring the modem to transmit at the power level.

2. A computer readable medium having stored therein instructions for causing a central processing unit to execute the method of claim 1.

3. The method of claim 1 wherein the querying and the retrieving steps comprise the steps of:

querying the table entry to determine whether the selection of transmission characteristics approximates the previously-negotiated transmission characteristics; and when the selection of transmission characteristics approximates the previously-negotiated transmission characteristics in the table entry, retrieving the power level from the table entry.

4. The method of claim 3 further comprising the step of:

selecting the table entry from a profile table on the modem.

5. The method of claim 1, wherein when the selection of transmission characteristics does not correspond to the previously-negotiated transmission characteristics, the method further comprising the steps of:

ascertaining an audible noise power level for the modem, wherein the audible noise power level depends on an audible noise characteristic, and wherein when the modem transmits at the audible noise power level, the audible noise from the telephone is reduced, ascertaining a downstream noise power level for the modem, wherein when the modem transmits at the downstream noise power level the noise in a downstream channel is reduced, and configuring the modem to transmit at the lesser of the downstream noise power level and the audible noise power level.

6. The method of claim 1 further comprising the steps of:

negotiating transmission characteristics for the modem when reaching the data transfer mode, and responsively storing the negotiated transmission characteristics in a new table entry, determining the power level for the modem when reaching the data transfer mode, and responsively storing the power level in the new table entry.

7. The method of claim 1, wherein the first plurality of tones is transmitted from a central office to the modem over the telephone loop while the telephone is on-hook;

wherein transmitting a second plurality of tones includes initiating transmission of a second plurality of tones from the central office to the modem over the telephone loop in response to the telephone going off-hook; and wherein the second plurality of tones is transmitted from the central office to the modem over the telephone loop while the telephone is off-hook.

8. The method of claim 1 wherein the calculating steps comprise the steps of:

obtaining a fist logarithmic power value in a first bin when the telephone is on-hook, wherein the first bin corresponds to one of the first plurality of tones having a first frequency, and wherein the first logarithmic power value corresponds to average power in the first bin;

obtaining a second logarithmic power value in a second bin when the telephone is on-hook, wherein the second bin corresponds to another of the first plurality of tones having a second frequency, and wherein the second logarithmic power value corresponds to average power in the second bin; and computing the on-hook power slope value proportional to the first logarithmic power value minus the second logarithmic power value, obtaining a third logarithmic power value in a third bin when the telephone is off-hook, wherein the third bin corresponds to one of the second plurality of tones having a third frequency, and wherein the third logarithmic power value corresponds to average power in the third bin;

obtaining a fourth logarithmic power value in a foil bin when the telephone is off-hook, wherein the fourth bin corresponds to another of the second plurality of tones having a fourth frequency, and wherein the fourth logarithmic power value corresponds to average power in the fourth bin; and computing the off-hook power slope value proportional to the third logarithmic power value minus the fourth logarithmic power value.

9. A The method of claim 1 wherein the first plurality of tones and the second plurality of tones are Fast Retrain tones.

10. The method of claim 1 wherein the selection of transmission characteristics comprises a direct current voltage level of the telephone loop, and wherein the measuring step comprises the step of:

measuring the direct current voltage level of the telephone loop.

11. A method for rapidly reducing noise from a telephone in a splitterless Asymmetric Digital Subscriber Line modem, wherein the telephone and the modem share a telephone loop, to enable simultaneous use of the telephone and the modem, the method comprising the steps of;

measuring a selection of transmission characteristics for the telephone loop, wherein the selection of transmission characteristics comprises a downstream noise power level, wherein when the modem transmits at the downstream noise power level the noise in a downstream channel is reduced and wherein the measuring step comprises the steps of:

(a) transmitting a first plurality of tones between the modem and a central office over the telephone loop while the telephone is on-hook:;

(b) measuring a first plurality of power density values for a first plurality of bins, wherein the first plurality of bins range from a first bin to a second bin;

(c) obtaining the first noise characteristic by summing the first plurality of power density values (d) transmitting a second plurality of tones between the modem and the central office over the telephone loop while the telephone is off-hook;

(e) measuring a second plurality of power density values for a second plurality of bins, wherein the second plurality of bins range from a third bin to a fourth bin, (f) obtaining the second noise characteristic by summing the second plurality of power density values (g) reducing transmitted power from the modem by a power cutback value; and (h) repeating a–g until the second noise characteristic is less than the first noise characteristic, wherein the transmitted power from The modem equals the downstream noise power level when the second noise characteristic is less than the first noise characteristic;

querying a table entry to determine whether the selection of transmission characteristics having the downstream noise power level corresponds to previously-negotiated transmission characteristics known to cause the modem to achieve a data transfer mode:;

when the selection of transmission characteristics having the downstream noise power when the selection of transmission characteristics having the downstream noise power level corresponds to the previously-negotiated transmission characteristics, retrieving a power level from the table entry, and configuring the modem to transmit at the power level.

12. A method for rapidly reducing noise from a telephone in a splitterless Asymmetric Digital Subscriber Line modem, wherein the telephone and the modem share a telephone loop, to enable simultaneous use of the telephone and the modem, the method comprising the steps of:

measuring a selection of transmission characteristics for the telephone loop, wherein the selection of transmission characteristics comprises a downstream noise power level wherein when the modem transmits at the downstream noise power level the noise in a downstream channel is reduced, and wherein the measuring step comprises the steps of;

(a) transmitting a first plurality of tones from the modem to a central office over the telephone loop while the telephone is on-hook;

(b) measuring a first plurality of power density values for a first plurality of bins, wherein the first plurality of bins range from a first bin to a second bin;

(c) obtaining the first noise characteristic by summing the first plurality of power density values;

(d) measuring a second noise characteristic for the telephone loop when the telephone is off-hook wherein the second noise characteristic is measured by the modem;

(e) reducing transmitted power from the modem by a power cutback value; and (f) repeating a–e until the second noise characteristic is less than the first noise characteristic, wherein the transmitted power from the modem equals the downstream noise power level when the second noise characteristic is less than the first noise characteristic;

querying a table entry to determine whether the selection of transmission characteristics having the downstream noise power level corresponds to previously-negotiated transmission characteristics known to cause the modem to achieve a data transfer mode;

when the selection of transmission characteristics having the downstream noise power level corresponds to the previously-negotiated transmission characteristics, retrieving a power level from the table entry, and configuring the modem to transmit at the power level.

13. The method of claim 12 wherein the first plurality of tones are Fast Retrain tones.

14. A method for rapidly reducing noise from a telephone in a splitterless Asymmetric Digital Subscriber Line modem, wherein the telephone and the modem share a telephone loop, to enable simultaneous use of the telephone and the modem, the method comprising the steps of:

measuring a selection of transmission characteristics for the telephone loop, wherein the selection of transmission characteristics comprises a downstream noise power level, wherein when the modern transmits at the downstream noise power level the noise in a downstream channel is reduced, and wherein the measuring step comprises the steps of:

(a) ascertaining a first noise characteristic for the telephone loop when the telephone is on-hook, wherein the first noise characteristic is measured by the modem;

(b) transmitting a second plurality of tones from the modem to a central office, over the telephone loop while the telephone is off-hook;

(c) measuring a second plurality of power density values for a second plurality of bins, wherein the second plurality of bins range from a third bin to a fourth bin; and (d) obtaining the second noise characteristic by summing the second plurality of power density values (e) reducing transmitted power from the modem by a power cutback value; and (f) repeating a–e until the second noise characteristic is less than the first noise characteristic, wherein the transmitted power from the modem equals the downstream noise power level when the second noise characteristic is less than the first noise characteristic;

querying a table entry to determine whether the selection of transmission characteristics having the downstream noise power level corresponds to previously-negotiated transmission characteristics known to cause the modem to achieve a data transfer mode;

when the selection of transmission characteristics having the downstream noise power level corresponds to the previously-negotiated transmission characteristics, retrieving a power level from the table entry, and configuring the modem to transmit at the power level.

15. The method of claim 14 wherein the second plurality of tones are Fast Retrain tones.

16. A method for rapidly reducing noise from a telephone in a splitterless Asymmetric Digital Subscriber Line modem, wherein the telephone and the modem share a telephone loop, to enable simultaneous use of the telephone and the modem, the method comprising the steps of:

a) detecting a first plurality of tones in the modem, wherein the first plurality of tones is transmitted from a central office to the modem over the telephone loop while the telephone is on-hook;

b) obtaining a first logarithmic power value in a first bin when the telephone is on-hook, wherein the first bin corresponds to one of the first frequency, and wherein the first logarithmic power value corresponds to average power in the first bin;

c) obtaining a second logarithmic power value in a second bin when the telephone is on-hook, wherein the second bin corresponds to another of the first plurality of tones having a second frequency, and wherein the second logarithmic power value corresponds to average power in the second bin; and d) computing an on-hook power slope value proportional to the first logarithmic power value minus the second logarithmic power value;

e) initiating transmission of a second plurality of tones from the central office to the modem over the telephone loop in response to the telephone going off-hook;

f) detecting the second plurality of tones in the modem, wherein the second plurality of tones is transmitted from the central office to the modem over the telephone loop while the telephone is off-hook;

g) obtaining a third logarithmic power value in a third bin when the telephone is off-hook, wherein the third bin corresponds to one of the second plurality of tones having a third frequency, and wherein the third logarithmic power value corresponds to average power in the third bin;

h) obtaining a fourth logarithmic power value in a fourth bin when the telephone is off-hook, wherein the fourth bin corresponds to another of the second plurality of tones having a fourth frequency, and wherein the fourth logarithmic power value corresponds to average power in the fourth bin;

i) computing an off-hook power slope value proportional to the third logarithmic power value minus the fourth logarithmic power value;

j) computing an audible noise characteristic as a difference between the on-hook power slope value and the off-hook power slope value;

k) transmitting a third plurality of tones from the modem to the central office over the telephone loop while the telephone is on-hook;

l) measuring a first plurality of power density values for a first plurality of bins, wherein the first plurality of bins range from a fifth bin to a sixth bin; and m) obtaining a first noise characteristic by summing the first plurality of power density values;

n) transmitting a fourth plurality of tones from the modem to the central office over the telephone loop while the telephone is off-hook;

o) measuring a second plurality of power density values for a second plurality of bins, wherein the second plurality of bins range from a seventh bin to an eighth bin; and p) obtaining a second noise characteristic by summing the second plurality of power density values;

q) reducing transmitted power from the modem by a power cutback value;

r) repeating steps (k) to (q) until the second noise characteristic is less than the first noise characteristic, wherein transmitted power from the modem equals a downstream noise power level when the second noise characteristic is less than the first noise characteristic;

s) determining whether the audible noise characteristic approximates a stored audible noise characteristic in a table entry and whether the downstream noise power level approximates a stored downstream noise power level in the table entry, wherein the table entry comprises stored transmission characteristics that permit the modem to achieve a data transfer mode; and t) when the audible noise characteristic approximates the stored audible noise characteristic and the downstream noise power level approximates the stored downstream noise power level, retrieving a power level from the table entry, and configuring the modem to transmit at the power level.

17. A computer readable medium having stored therein instructions for causing a central processing unit to execute the method of claim 16.

* * * * *

UNITED STATES PATENT AND TRADEMARK OFFICE
CERTIFICATE OF CORRECTION

PATENT NO. : 6,628,754 B1
DATED : September 30, 2003
INVENTOR(S) : Tim Murphy et al.

It is certified that error appears in the above-identified patent and that said Letters Patent is hereby corrected as shown below:

<u>Title page,</u>
Item [*] Notice, should read -- 136 days -- instead of "16 days".

Signed and Sealed this

Eighth Day of November, 2005

JON W. DUDAS
*Director of the United States Patent and Trademark Office*